United States Patent [19]

Dönig et al.

[11] 4,413,225
[45] Nov. 1, 1983

[54] METHOD OF OPERATING AN ELECTROSTATIC PRECIPITATOR

[75] Inventors: Gerhard Dönig, Erlangen; Walter Schmidt, Uttenreuth; Helmut Schummer, Heusenstamm; Franz Neulinger, Dietzenbach, all of Fed. Rep. of Germany

[73] Assignee: Siemens Aktiengesellschaft, Berlin and Munich, Fed. Rep. of Germany

[21] Appl. No.: 284,491

[22] Filed: Jul. 17, 1981

[30] Foreign Application Priority Data

Jul. 17, 1980 [DE] Fed. Rep. of Germany ....... 3027172

[51] Int. Cl.³ .......................... B03C 3/68; G05F 1/56
[52] U.S. Cl. .................................. 323/246; 323/241; 323/903; 323/267; 307/2; 55/105
[58] Field of Search .................. 323/241, 245–246, 323/267–272, 903; 307/2, 4–8, 56; 55/105, 139; 363/35, 37, 51, 136

[56] References Cited

U.S. PATENT DOCUMENTS

| | | | |
|---|---|---|---|
| 2,997,642 | 8/1961 | Brooks | 55/105 |
| 3,443,358 | 5/1969 | Drenning et al. | 55/105 X |
| 3,984,215 | 10/1976 | Zucker | 55/105 X |
| 4,233,039 | 11/1980 | Schmidt | 307/2 X |
| 4,290,003 | 9/1981 | Lanese | 323/903 |

*Primary Examiner*—William M. Shoop
*Assistant Examiner*—Peter S. Wong
*Attorney, Agent, or Firm*—Kenyon & Kenyon

[57] ABSTRACT

A method for operating an electrostatic precipitator with a DC voltage and superimposed pulses or superimposed AC voltage in which individual parameters such as amplitudes, pulse repetition frequency, pulse width, etc. are iteratively and continuously varied in such a manner that the sum of the pulse and the DC voltage power approaches a minimum. A computer which calculates, from the dust load and the absorbed electric energies of the filter, control commands for the DC and pulse voltage source is used for this purpose.

4 Claims, 5 Drawing Figures

METHOD OF OPERATING AN ELECTROSTATIC PRECIPITATOR

BACKGROUND OF THE INVENTION

This invention relates to a method for operating an electrostatic precipitator with a DC voltage, the level of which can be changed, and superimposed DC voltage pulses, in which at least one of the parameters, pulse amplitude, pulse width, pulse repetition frequency and rate of rise of the pulses can be varied.

As a rule, electrostatic precipitators are nowadays operated with a high DC voltage which is generated by rectification from an AC power network.

It is furthermore known in the art to operate electrostatic precipitators with high frequency AC current or with low frequency AC current below 50 Hz. (See column 1 of German Pat. No. 14 57 140.)

The use of pulsating DC voltage as the supply voltage is also known in the art; the pulsating DC voltage can be obtained by superposition of a DC voltage and a sinusoidal AC current, or by means of bridge rectification. (See column 1 of German Pat. No. 14 57 140.)

Another method known in the art is to vary the frequency of the pulsating DC voltage half waves at the electrostatic precipitator in such a manner that a predetermined breakdown frequency per unit time remains constant. (See, for instance, German Pat. No. 14 57 140.)

A DC voltage with superimposed voltage pulses has also been used. (See U.S. Pat. No. 4,133,649.)

Theoretical considerations and tests regarding this subject can also be found, for instance, in the journal: "Staub-Reinhaltung der Luft", no. 36, 1976, no. 1, pp. 19-26.

It is evident from the above-mentioned literature references that those skilled in the art have recognized that the amplitude of the DC voltage and pulses, the pulse frequency and the flank slope of the pulses play a part.

Since, in addition to these factors, the nature of the dust to be precipitated in such a case also plays an important part, it is understandable that it has not yet been possible, to date, to specify an optimum of the operating parameters which would fit each respective operating condition.

It is an object of the present invention to describe a relatively simple optimizing method, including a permissible dust load in the purified gas.

SUMMARY OF THE INVENTION

According to the present invention, this problem is solved by the provision that the DC voltage and/or one of the parameters of the pulses are continuously and automatically varied iteratively in such a manner that the sum of the electric energies of DC voltage and pulses received by the precipitator approaches a minimum, preserving a set average of dust charge in the purified gas. Through this optimization of the installation for a minimum of energy, a relatively simple criterion for the drive of the pulse voltage source or the DC voltage source is obtained.

The above-described method is also suitable for the operation of an installation consisting of several electrostatic precipitators of which at least one of the precipitators or precipitation zones is operated with DC voltage and superimposed pulses. Also, by varying all parameters iteratively, the required energy can be caused to approach a minimum, where the dust charge of the purified gas at the output of the installation is given.

For generating the DC voltage and the pulse voltage, rectifiers or convertors, advantageously designed with thyristors or appropriate capacitors and high-velocity spark gaps are used which, in turn, obtain their control commands from a computer connected to a dust charge measuring device.

DETAILED DESCRIPTION

Figure 1:
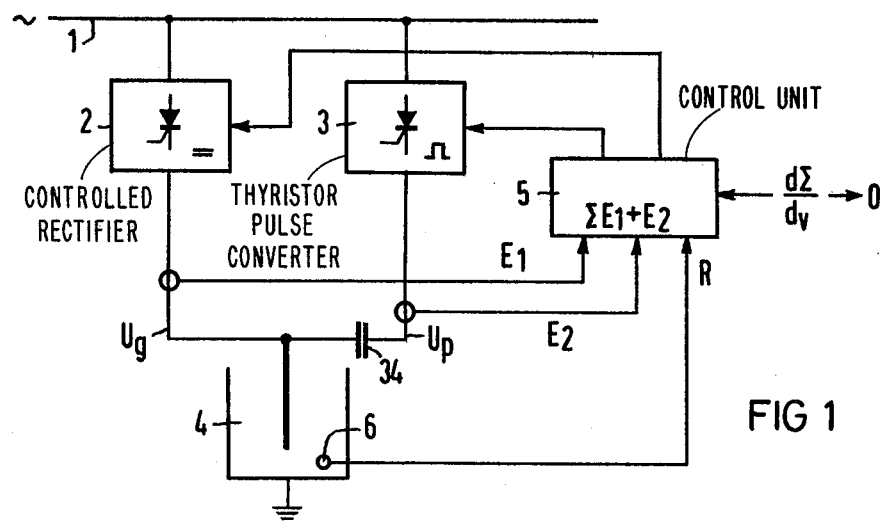
FIG. 1 is a schematized design of an electrostatic precipitator installation.

The electrostatic precipitator 4, schematically shown in FIG. 1 is supplied with high voltage DC in a manner known per se from an AC voltage network 1 via a controlled rectifier 2. In addition, the DC voltage $U_g$ present at the precipitator has superimposed on it, via a coupling capacitor 34, pulses $U_p$ which come from a pulse voltage source in the form of a thyristor pulse converter 3 connected to the network 1. The rectifier 2 as well as the controlled pulse voltage source 3 obtain control commands from a control unit 5, to which signals proportional to the electric energy E1 delivered by the DC voltage equipment and to the energy E2 delivered by the pulse voltage source 3 are fed as actual values. In the control unit 5, a signal proportional to the sum of both energies is formed, and at least one of the parameters is continuously changed in such a manner that the absorbed energy sum E1 plus E2 approaches a minimum.

Figure 2:
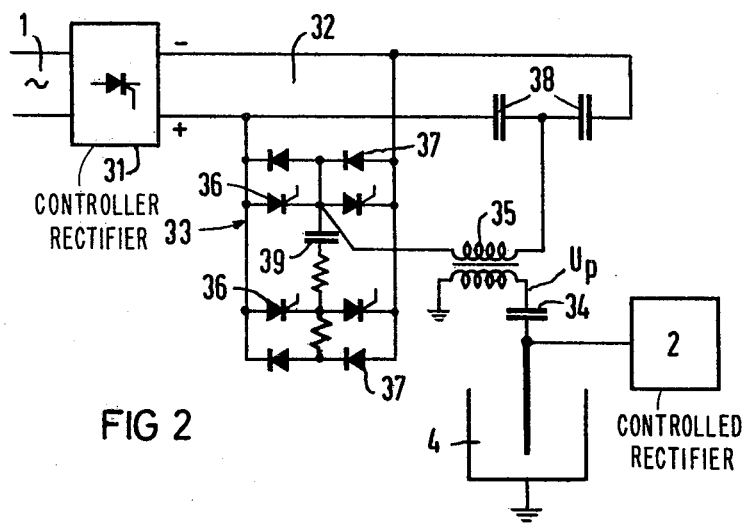
FIG. 2 is a more detailed circuit diagram of the pulse voltage source used in the installation according to FIG. 1.

FIG. 2 shows details regarding the design of the pulse voltage source 3. As can be seen, the line AC voltage is first rectified by means of a controlled rectifier 31. The inverter 33 is connected to the DC intermediate link 32 at the output of the rectifier 31, and consists of the main valves 36 and the quenching valves 37. The resonant circuit 39, arranged between the main valves, is connected at one end, via the primary winding of a transformer 35 and capacitors 38, to the intermediate DC link 32. The pulse voltage $U_p$ which appears at the secondary winding of the transformer 35 is fed to the electrostatic precipitator via the coupling capacitor 34, together with the DC voltage coming from the rectifier 2.

Figure 3:
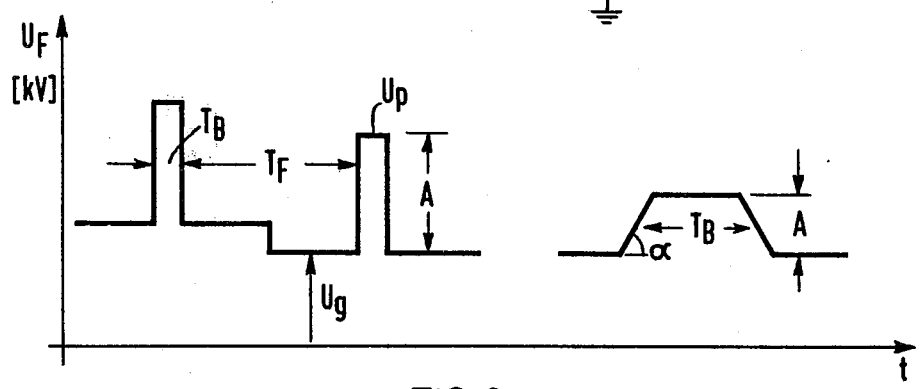
FIG. 3 shows the waveform of the filter voltage in an installation according to FIG. 1.

The converter can also be replaced by a suitable chopper circuit, for the thyristors of which quenching circuits will be optionally provided. This results in the waveform of the precipitator voltage $U_F$ shown idealized in FIG. 3. As will be seen, the precipitator voltage consists of a DC component $U_g$ and a pulse voltage component $U_p$, where, as variable parameters of the pulse voltage, the amplitude A, the pulse width $T_B$, the rate of rise of the pulses, and the pulse repetitition frequency $1/T_F$ should be mentioned.

Figure 4:
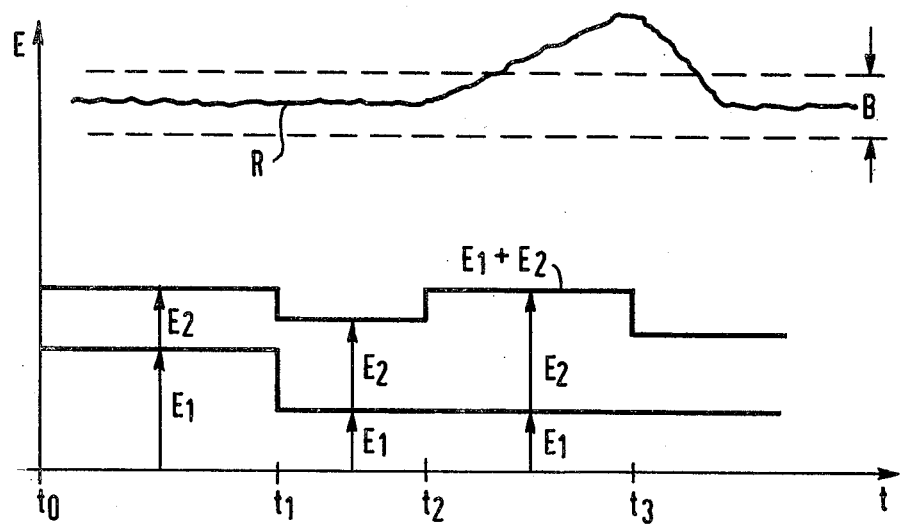
FIG. 4 is an idealized diagram of the dust precipitator and the energies delivered by the DC voltage source and the pulse voltage source, plotted versus time.

FIG. 4 shows the iterative search procedure in an idealized presentation, where the relative magnitudes between E1 and E2 are not shown to scale. As will be seen, the total power supplied at the time to form the DC voltage power E1 and the pulse power E2 leads to a degree of dust removal R of the precipitator which is inside a permissible tolerance region B.

At the time t1, the DC filter voltage and thereby the electric power E1, is reduced and at the same time the pulse power E2 is increased. Overall, this results in a reduction of the total energy E1+E2 without the mean value of the precipitation R falling below the predetermined limits. It would now make sense to continue this approach until the lower permissible limit is reached. In the present case, however, a different approach is indicated, namely, that the pulse power E2 is increased at the time t2 still further so that an overall power is obtained which agrees again with that at the time t0. This however, results in a mean value of the precipitation R which exceeds the upper limit of the specified region B. Since such excess is not necessary, the energy E2 is reduced again at the time t3 automatically, while the energy E1 remains constant, so that a degree of dust removal which is again within the tolerance region B establishes itself and specifically, with a total energy E1 plus E2, which is distinctly below the energy at the start of the search procedure.

To simplify the presentation, it was assumed that only the DC voltage and the amplitude of the DC voltage pulses were changed. With the aid of a computer, on the other hand, a far more sensitive adaption in a multiplicity of iterative steps is possible by varying all the parameters.

Figure 5:
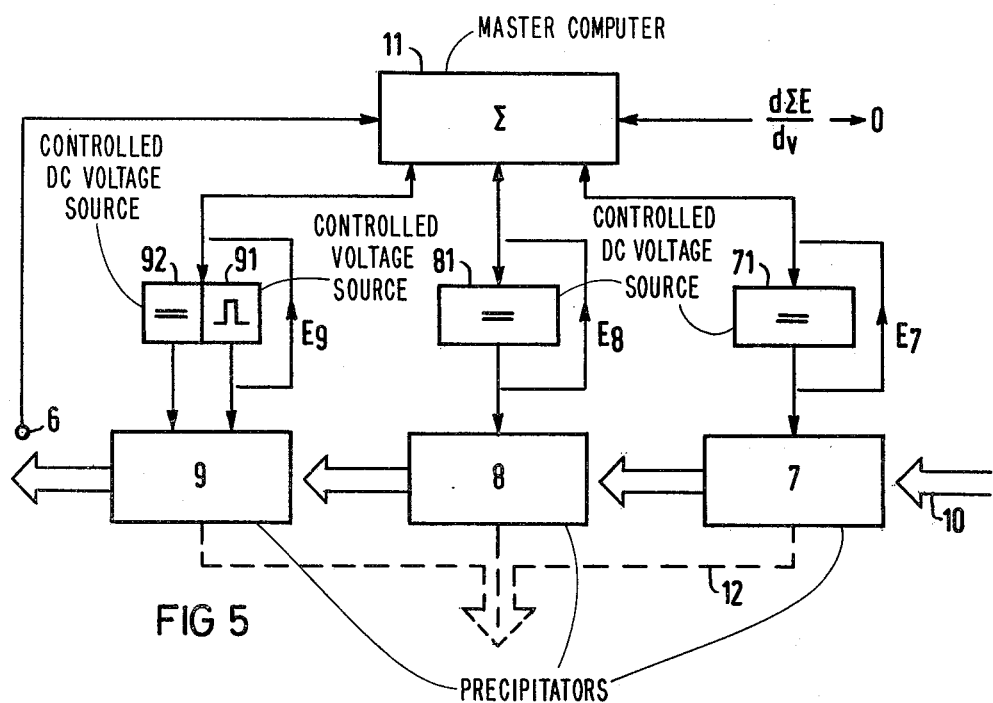
FIG. 5 shows an electrostatic precipitator installation which consists of several precipitators or precipitation zones.

The method as described above can also be applied within an installation consisting of a number of precipitators or precipitation zones 7, 8 and 9 as shown in FIG. 5. Here, the gas 10 to be purified flows successively through the individual precipitators or precipitation zones 7, 8 and 9. As indicated by dashed lines at 12, the precipitation zones 7, 8 and 9 can also be connected in parallel. The precipitators or precipitation zones 7 and 8 each have a controlled DC voltage 71 or 81. Associated with the precipitation zone 9, however, is a combined voltage supply which consists of the DC voltage source 92 and the controlled voltage source 91. The electric powers E7, E8 and E9, absorbed in the precipitators, are reported to a master computer 11 which forms the sum of these measurement values. Through suitable control commands of the computer 11, the individual powers E7, E8, and E9 are varied iteratively in such a manner that the overall sum of the energies E7+E8+E9 approaches a minimum, where the maintenance of the predetermined dust charge limits is monitored by means of the dust charge measuring device 6. Such an arrangement of a master computer is described, for example, in U.S. Pat. No. 4,354,860.

On occasion it may also be of advantage to associate with the first precipitator or all precipitation zones a combined voltage power supply.

If superimposed voltage pulses are used, it may also be advantageous, in a modification of the method, if the pulse repetition frequency of the voltage source is automatically increased or decreased at certain time intervals continuously or step-wise. The time intervals are varied iteratively and automatically in such a manner that the dust content of the purified gas at the exit of the installation approaches a minimum. The advantage of this method is that pulse repetition frequencies associated with certain dust fractions or mass fractions or different kinds of dust, and which are optimum for the electrical charge are traversed.

In the present case, the superimposition of an AC voltage is understood to also be included in the term "superimposed voltage pulses".

Recognizing these above-mentioned optimum settings is of great interest in view of an economic operation of the electrostatic precipitator.

What is claimed is:

1. A method for the operation of an electrostatic precipitator having a filter through which a gas containing dust is passed to result in a purified gas with a predetermined dust charge, with a DC voltage, the level of which can be varied, and with superimposed pulses, in which at least one of the parameters, pulse amplitude, pulse width, pulse repetition frequency and pulse rate of rise is variable, comprising automatically changing the DC voltage and/or one of the parameters of the pulses iteratively in such a manner that the sum of the electric energies of the DC voltage and the pulses absorbed by the filter approaches a minimum, while a predetermined mean value of the dust charge of the purified gas is maintained.

2. The method according to claim 2, comprising decreasing the DC voltage with an increase of the amplitude of the pulses and/or the pulse repetition frequency.

3. The method according to claim 1, comprising automatically increasing or decreasing iteratively the time intervals, at which the pulse repetition frequency of the superimposed pulses are applied to the precipitator in such a manner that the dust charge of the purified gas approaches a minimum.

4. A method for operating an installation that consists of one or more electrostatic precipitators or precipitation zones, each have a filter for removing dust from a gas to provide a purified gas with a predetermined dust charge, of which at least one of the precipitators or precipitation zones is operated with DC voltage and superimposed pulses, comprising automatically varying the DC voltage of at least one filter and/or the pulses in such a manner that the sum of the electric energies absorbed by all precipitators approaches a minimum, while the dust charge in the purified gas at the output of the installation is maintained within predetermined limits.

* * * * *

UNITED STATES PATENT AND TRADEMARK OFFICE
CERTIFICATE OF CORRECTION

PATENT NO. : 4,413, 225
DATED : November 1, 1983
INVENTOR(S) : Gerhard Donig et al.

It is certified that error appears in the above-identified patent and that said Letters Patent are hereby corrected as shown below:

On the cover page of the Patent, change

"[73] Assignee: Siemens Aktiengesellschaft, Berlin and Munich, Fed. Rep. of Germany" to --[73] Assignees: Metallgesellschaft Aktiengesellschaft, Frankfurt/Main, Fed. Rep. of Germany and Siemens Aktiengesellschaft, Berlin and Munich, Fed. Rep. of Germany--

Signed and Sealed this

Tenth Day of April 1984

[SEAL]

Attest:

GERALD J. MOSSINGHOFF

Attesting Officer

Commissioner of Patents and Trademarks